United States Patent [19]

Nielsen

[11] Patent Number: 4,557,688
[45] Date of Patent: Dec. 10, 1985

[54] METHOD AND APPARATUS FOR CALCINING PULVERULENT RAW MATERIAL

[75] Inventor: Peter B. Nielsen, Copenhagen, Denmark

[73] Assignee: F. L. Smidth & Co. A/S, Denmark

[21] Appl. No.: 522,395

[22] Filed: Aug. 11, 1983

[30] Foreign Application Priority Data

Sep. 2, 1982 [DK] Denmark ............................ 3925/82

[51] Int. Cl.⁴ .......................... F27B 15/00; F27B 7/02
[52] U.S. Cl. ....................................... 432/14; 432/106
[58] Field of Search ................... 432/14, 106; 106/100

[56] References Cited

U.S. PATENT DOCUMENTS

| | | |
|---|---|---|
| 3,203,681 | 8/1965 | Rosa et al. ............................. 432/58 |
| 3,904,353 | 9/1975 | Bosshard et al. ...................... 432/14 |
| 4,071,310 | 1/1978 | Ghestem ................................ 432/14 |
| 4,381,916 | 5/1983 | Warshawsky ......................... 432/14 |
| 4,404,032 | 9/1983 | Nudelman et al. .................. 106/100 |

FOREIGN PATENT DOCUMENTS 1463124 2/1977 United Kingdom .

OTHER PUBLICATIONS

"Cement-Data Book", by Walter H. Duda, MacDonald and Evans, London, 2nd Edition, 1977, pp. 407-436.

Primary Examiner—John J. Camby
Attorney, Agent, or Firm—Brumbaugh, Graves, Donohue & Raymond

[57] ABSTRACT

A method and an apparatus for calcining pulverulent raw material, in particular cement raw meal, wherein the material is calcined suspended in a stream of hot gas in a calcining zone (4) in an overheated atmosphere by burning fuel in a stream of oxygen-containing gas in the zone, and precipitated in a precipitation zone (9). The rate of combustion of the fuel is accelerated by maintaining a temperature within the range 900°-1250° C. in the calcining zone by dividing the raw material into two streams (22',22) introducing and calcining only the first stream of material (22') in the calcination chamber (4). The temperature of the hot suspension withdrawn from the calcining zone is reduced by 100°-300° C. to a level within the range 800°-1000° C. by suspending the second stream of material (22) in the hot suspension during withdrawal thereof from the calcination chamber (4) and before the calcined material is precipitated in the precipitator (9).

14 Claims, 5 Drawing Figures

METHOD AND APPARATUS FOR CALCINING PULVERULENT RAW MATERIAL

The present invention concerns a method (hereinafter referred to as of the kind described) of calcining pulverulent raw material, in particular pulverulent raw material containing calcium carbonate, in a calcining zone in suspension in a stream of hot gas produced by burning fuel in a stream of oxygen-containing gas, withdrawing the suspension from the calcining zone, precipitating the calcined material from the suspension in a precipitation zone, and withdrawing gas and precipitated material from the precipitation zone as calciner exit gas and calcined product, respectively, and a calcining apparatus for carrying out this method.

The method and the apparatus may be used when calcining pulverulent raw material where the calcined product is subsequently cooled in a cooler and withdrawn from the cooler as an end product, i.e. limestone, alumina and phosphate minerals are used as pulverulent raw material, but also when the calcined product is an intermediate product immediately subjected to further heat treatment, i.e., when the pulverulent raw material is e.g. cement raw meal, in particular Portland cement raw meal with an oxide analysis on an ignition free basis within the range CaO: 60–67% by weight, $SiO_2$: 17–25% by weight, $Al_2O_3$: 3–8% by weight, $Fe_2O_3$: 0.5–6% by weight, MgO: 0.1–5.5% by weight, $Na_2+K_2O$: 0.5–1.3% by weight and $SO_3$: 1–3% by weight, or starting material for the lime or lime/soda process for converting complex aluminium silicates to dicalcium-silicate and water soluble aluminates.

The method and the apparatus are particularly suitable for calcining cement raw meal, especially Portland cement raw meal in cement production plants.

Manufacture of cement clinker takes place in 4 phases:
(1) Preheating pulverulent raw material to about 750° C.
(2) Calcining preheated pulverulent raw material at about 850° C.
(3) Heating calcined raw material to sintering temperature and sintering to cement clinker at about 1400° C.
(4) Cooling the cement clinker to about 100° C.

Over the last 20 years practice has shown that it is advantageous to carry out the 4 phases in separate devices viz. (1) in a multi-stage suspension preheater, (2) in a suspension calciner with a separate fuel supply and comprising a calcination chamber connected to a precipitation chamber, (3) in a rotary kiln with a separate fuel supply and (4) in an air cooler, the exit air of which is used when burning fuel in the calciner and the rotary kiln, while exit gas from the calciner and/or the rotary kiln is used as the heat source in the preheater.

The term "suspension" may indicate a two-phase system consisting of a finely divided solid dispersed in a solid, liquid or gas. However, in the present specification the term "suspension" is intended to indicate a gas/particle suspension, i.e. a two-phase system consisting of a finely divided solid dispersed in, and entrained by, a stream of gas.

Numerous proposals for methods and apparatus for calcining pulverulent raw materials in suspension have been made, and a number thereof have been successfully implemented on a large industrial scale.

Suspension calciners comprising a separate combustion chamber, i.e., a hot gas generator, connected to a calcination chamber in which the preheated material was suspended in, and calcined by, the hot exit gas from the gas generator, were suggested by Rosa in U.S. Pat. No. 3,203,681.

However, very large amounts of extremely hot gas are required for ensuring a reasonable degree of calcination of the preheated raw material by the Rosa method. Therefore, the construction with separate hot gas generators and calcining chambers was abandoned, and calciners in which the heat is generated where it is needed, i.e., in the calcination chamber, were developed, providing a more homogeneously calcined end product, and more homogeneous calcining conditions, which are considered essential in order to produce stable operation and optimal end product.

A comprehensive survey of the industrial utilized calcining methods may be found in Walter H. Duda, CEMENT-DATA BOOK, Macdonald and Evans, London, 2nd Edition, 1977, page 407–436.

The calcining methods may be classified as follows:
(i) helical/non-helical movement of suspension
(ii) direction of suspension; upward/downward/other directions
(iii) pulverulent raw material introduced into calciner as a coherent stream/suspended in gas, e.g. in hot air
(iv) raw material introduced at one/more places
(v) gas introduced at one/more places
(vi) fuel introduced at one/more places The calciner disclosed in GB-A-1,463,124, is a non-helical, upward, coherent stream raw material calciner with one inlet for gas and at least one inlet for raw material and fuel.

As calciner fuel all types of gas, oil and pulverized coal may be used, but due to increases in prices of gas and oil the use of pulverized coal, in particular coal dust with a fineness corresponding to a residue of 10–30% on a 90 micron sieve, as fuel, has attracted increasing interest.

Experience, however, has shown that not all types of pulverized coal are equally suited as calciner fuel.

In particular pulverized coal with a content of volatile matter (determined according to ASTM Standard D3175) below 30%, pulverized coal with a broad particle size distribution, and/or pulverized coal having a considerable amount of coarse particles, may present difficulties due to lack of total burning out of in particular, the coarse coal particles. This may show itself partly as undesirable burning in the precipitation chamber and partly as undesirable occurences of unburnt coal in the calcined product withdrawn from the precipitation chamber.

Also when gas is used as calciner fuel corresponding difficulties may occur due to too slow gas combustion velocity at the calcining temperature.

It is the object of the invention to provide a method where these difficulties are reduced and in accordance with the invention, a method of the kind described is characterized by introducing fuel, a stream of oxygen-containing gas, and a first stream of pulverulent raw material into the calcining zone; calcining the raw material in the calcining zone in an overheated atmosphere at a temperature of 900°–1250° C., the gas retention time being within the range 0.5–5 seconds in the calcining zone; and reducing the temperature of the suspension withdrawn from the calcining zone by 100°–300° C. to a level within the range 800°–1000° C. by suspending a second stream of the pulverulent raw material in the suspension during withdrawal thereof from the calcining zone and before the calcined material is precipitated in the precipitation zone.

It has surprisingly been found that it is possible to reduce the burning out time for gas, and even for difficult types of coal, by operating at a temperature in the burning zone which is 100°–300° C. higher than according to normal calcining conditions without meeting problems of overheating, hot spots, and bakings in the calcining zone.

The first stream of pulverulent raw material is suspended in the gas stream in the calcining zone, and because of the high temperature in the latter it is calcined almost completely in that zone. For the same reason the reaction velocity for the reaction between fuel and oxygen is sufficiently high to ensure complete burning out of gas and even of difficult types of coal. The second stream of pulverulent raw material is then introduced into and suspended in the hot suspension withdrawn from the calcining zone, providing a highly efficient cooling of the hot suspension and a corresponding heating of the second stream of pulverulent raw material, providing practically any desired degree of calcination of the second stream of pulverulent raw material, i.e. any desired degree of calcination of the calcined product withdrawn from the precipitation zone, depending on the mass ratio between the first and the second streams of pulverulent raw material.

An efficient burning out of the fuel and a minimal risk of damaging overheating of the pulverulent raw material are obtained by maintaining a temperature in the calcining zone within the range 950°–1150° C., and a gas retention time in that zone within the range 1–3 seconds. It is also preferred to reduce the temperature of the suspension withdrawn from the calcining zone by 150°–250° to a value within the range 850°–950° C., because it has been found that values above 950° C. lead to a too high temperature level in the preheater, and values below 850° correspond to degrees of calcination of the calcined product below about 85%.

When the pulverulent raw material is cement raw meal, the calcined product is subjected to further heat treatment in a sintering zone, e.g. in a rotary kiln, and the sinter product is cooled in an air cooler, as described above.

Air, in particular hot air from a cooler, in which the end product is cooled, a mixture of hot air from the cooler and kiln exit gas, or kiln gas with an oxygen content above 5% by volume may be used as oxygen-containing gas.

As fuel there may be used liquid fuels, such as fuel oil, gaseous fuels, such as natural gas, and solid fuels, such as pulverized coal.

The second stream of pulverulent raw material may be suspended in the suspension withdrawn from the calcining zone as a coherent material stream.

The second stream of pulverulent raw material may also be suspended in the suspension withdrawn from the calcining zone by introducing the second stream suspended in an inert gas into the suspension, where the term "inert gas" is intended to indicate gas having an oxygen content below 5% by volume. Kiln exit gas may be used as inert gas.

The second stream of pulverulent raw material may be introduced and suspended in the suspension withdrawn from the calcining zone before or after the suspension is introduced into the precipitation zone.

The former case is preferred because it ensures a particularly efficient contact between the hot suspension and the second stream of pulverulent raw material, i.e. a particularly efficient cooling in the zone between the calcining and precipitation zones.

The second stream of pulverulent raw material may be introduced directly into a duct connecting the calcining zone with the precipitation zone.

Gas retention times in the zone between the place at which the second stream of pulverulent raw material is suspended in the suspension withdrawn from the calcining zone and the inlet of the precipitation zone between 0.1 and 3, preferentially between 0.2 and 1.5 seconds, correspond to preferred cooling times in the cooling zone defined above.

The calciner exit gas (and the exit gas from the rotary kiln) may be used for preheating the pulverulent raw material to a temperature within the range 500°–850° C., thus providing two streams of pulverulent raw material having a temperature within that range, preferentially within the range 600°–830° C.

The two streams of preheated pulverulent raw material may be produced in separate parallel preheaters, or by dividing a hot stream of pulverulent raw material into two streams. In the latter case, the streasm is divided by known methods, e.g. by means of splitting gates or by dividing a suspension of the material into two streams and directing the two streams to separate precipitation cyclones.

As mentioned above, the temperature of the hot suspension from the calcining zone may be reduced, as desired, by suspending in the suspension appropriate quantities of the second stream of pulverulent raw material. The desired temperature reduction may be achieved by maintaining the mass ratio between the first and the second stream of pulverulent raw material within the range 10-1.

The present invention also includes a calcining apparatus for carrying out the method according to the invention, the apparatus comprising a tubular calcination chamber having an upright axis, an annular bottom wall which slopes downwardly and inwardly, a central inlet for oxygen-containing gas in the bottom, inlets for leading fuel and a first stream of pulverulent raw material into a bottom portion of the chamber, and a suspension outlet at the top of the chamber; a suspension transfer duct leading from the suspension outlet of the calcination chamber to a suspension inlet of a particle precipitator which has outlets for calciner exit gas and calcined product, respectively; and an inlet for delivering a second stream of pulverulent raw material into the path of the suspended first stream of raw material between the suspension outlet of the calcination chamber and the calciner exit gas outlet of the particle precipitator.

This construction of calcination chamber ensures a particularly efficient combustion of the fuel and a particularly efficient suspension of the first stream of pulverulent raw material.

As mentioned above, the second stream of pulverulent raw material may be introduced into, and suspended in, the hot suspension withdrawn from the calcining zone before or after the suspension is introduced into the precipitation zone.

According to a preferred embodiment of the latter case, the particle precipitator may be provided with an inlet duct for the second stream of pulverulent raw material or with an inlet duct for an inert gas which duct has an inlet for the second stream of pulverulent raw material.

According to a preferred embodiment of the former case, the suspension transfer duct may be provided with an inlet for the second stream of pulverulent raw material or may join an inert gas duct which has, upstream of the junction, an inlet for the second stream of pulverulent raw material.

Some examples of cement production plants incorporating calcining apparatus constructed and operating in accordance with the invention are illustrated diagrammatically in the accompanying drawings, in which.

The same references are used for similar units in the different figures. The plant has a rotary kiln 1 provided with a burner which is not shown and connected to an air cooler 2 having a pipe 3 leading part of the cooler exit air to a calciner apparatus. The calciner apparatus comprises a calcination chamber 4 with inlets for fuel 5, a first stream of pulverulent raw material 6, and oxygen-containing gas 7, and is provided with a suspension outlet duct 8 connected to a suspension inlet 37 of a particle precipitator cyclone 9 which has a calciner exit gas outlet 10 and an outlet duct 11 for calcined material leading the calcined material to the rotary kiln 1. The calciner apparatus is further provided with an inlet 12 for a second stream of pulverulent raw material.

The calciner exit gas outlet 10 and an outlet 13 for exit gas from the rotary kiln communicate with a multi-stage cyclone preheater comprising riser pipes 14, 14', 15, 15', 16, 16' and 17 directed to cyclones 18, 18', 19, 19', 20, 20' and 21, respectively, provided with material outlet ducts 22, 22', 23, 23', 24, 24' and 25 respectively. The multi-stage cyclone preheater is further provided with raw material inlet ducts 26 and 26' and exit gas outlets 27 and 27' leading to filters and ventilators not shown.

Figure 4:
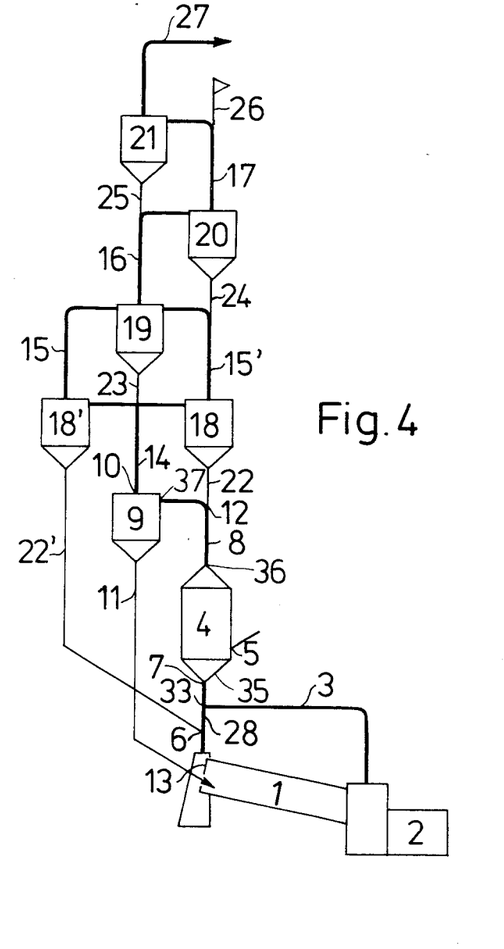
FIG. 4 shows a similar plant where the calcination chamber is provided with an inlet for a suspension of the first stream of preheated pulverulent raw material in a mixture of kiln exit gas and hot air, and the second stream of pulverulent raw material is introduced into the suspension transfer duct as a coherent material stream; and, FIG. 5 shows a similar plant in which the second stream of pulverulent raw material is suspended in kiln gas and mixed in the particle precipitator with the suspension withdrawn from the calcining zone.
Figure 5:
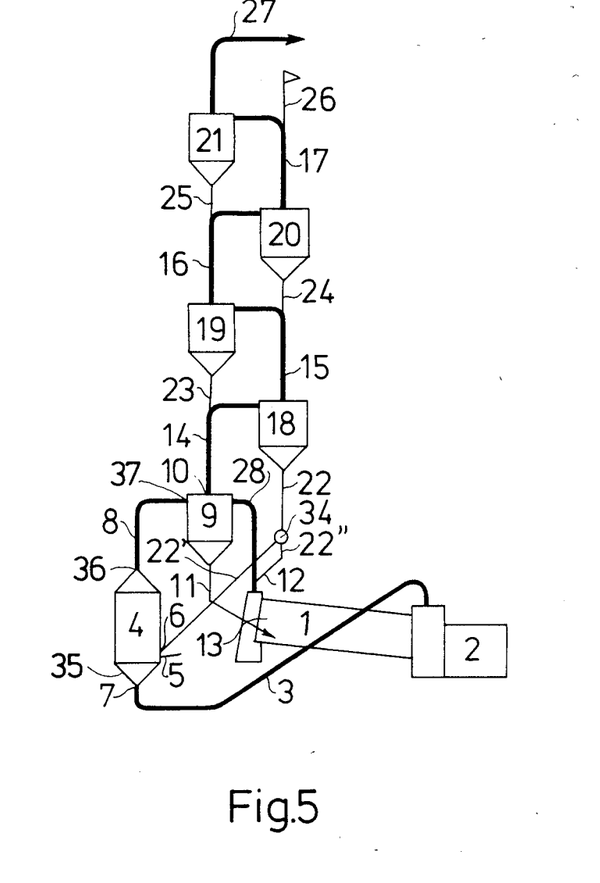

In operation, the pulverulent raw material is introduced into and preheated in the preheater from which the two streams of preheated pulverulent raw material are withdrawn either from cyclones 18 and 18', respectively, (FIGS. 1–4) or by dividing the stream from cyclone 18 (FIG. 5). The two streams of preheated pulverulent raw material are introduced into and calcined in the calciner assembly, withdrawn as precipitated, calcined material from the cyclone 9, and directed to the rotary kiln 1, where it is subjected to further heat treatment.

Figure 1:
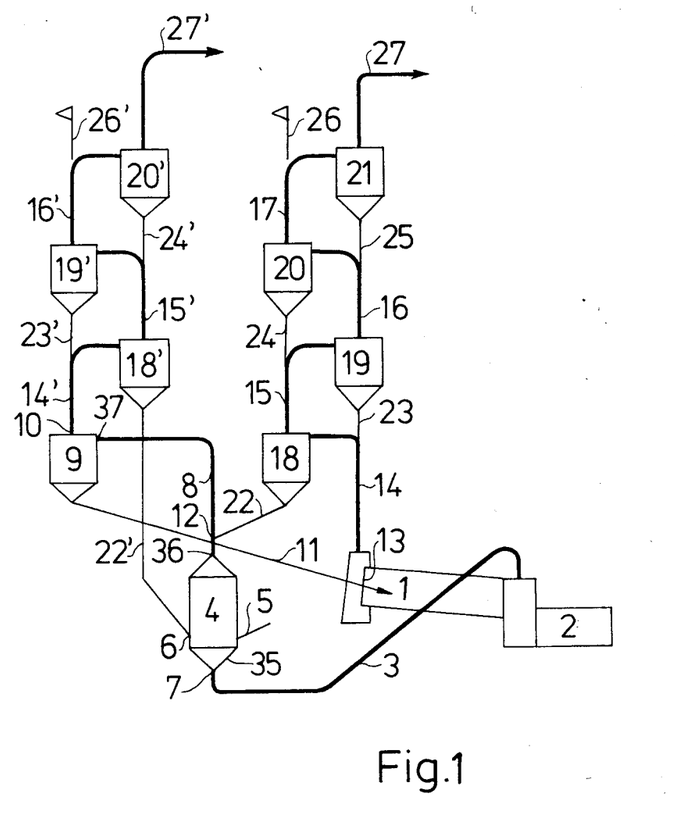
FIG. 1 shows a two-string preheater plant in which the second stream of pulverulent raw material is introduced into the suspension transfer duct as a coherent material stream.

In the plant shown in FIG. 1, the preheater is constructed as a two string preheater with two parallel cyclone strings fed with exit gas from the calciner assembly and rotary kiln, respectively.

The material preheated in the calciner string is, via the material outlet 22', introduced into the calcination chamber as the first stream of pulverulent raw material, and the material preheated in the kiln string is, via the material outlet duct 22, introduced as the second stream of material into and suspended in the suspension withdrawn from the calcining zone as a coherent material stream. The calcination chamber 4 is a tubular chamber having an upright axis, an annular bottom wall 35 which slopes downwardly and inwardly with the gas inlet 7 centrally positioned. The inlets 5 and 6 are separate ducts for discharging fuel and the first stream of raw material from the duct 22' onto or near the bottom of the chamber. A suspension outlet opening 36 at the top of the chamber is connected to the transfer duct 8. The inlet for oxygen-containing gas 7 is connected directly to the hot air pipe 3.

Figure 2:
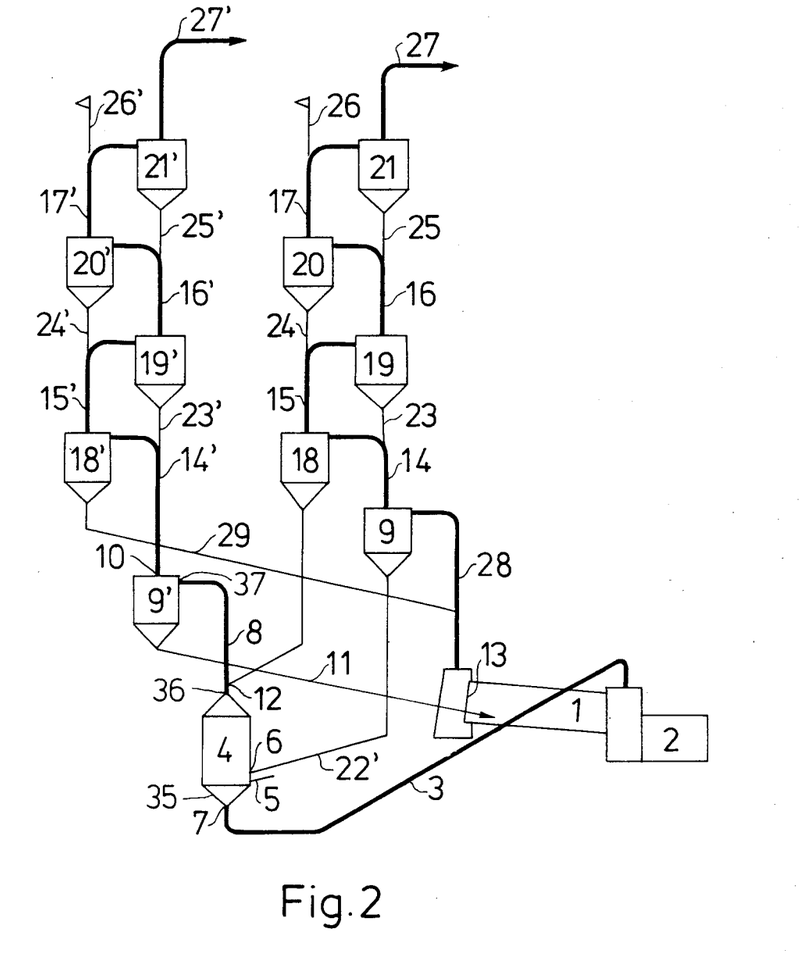
FIG. 2 shows a similar plant in which the second stream of pulverulent raw material is also introduced into the suspension transfer duct while the first stream of pulverulent raw material is fed from the calciner string to the kiln riser pipe and from here via a precipitator to the calcination chamber.

In the plant shown in FIG. 2, the preheater is likewise constructed as a two string preheater with two parallel cyclone strings. The material preheated in the calciner string is, however, via a material outlet duct 29 introduced as the first stream of raw material, into a kiln riser pipe 28, where it is suspended and partly calcined in the kiln exit gas, whereafter the suspension is fed to the precipitator cyclone 9 from which the treated raw material is, via the duct 22' fed to the bottom of the calcination chamber 4, which is similar to the chamber 4 in FIG. 1, for further heat treatment. The second stream of raw material which has been preheated in the kiln string is introduced, via the duct 22, into the suspension of calcined material and calciner exit gas withdrawn from the calcination chamber 4, and together with this suspension introduced into a precipitator cyclone 9'. Compared to the plant shown in FIG. 1, the plant according to FIG. 2 ensures that the first, and normally the greater, stream of raw material, after preheating in the calciner string is further preheated and also partly precalcined in the lowermost step of the kiln string before being fed to the calcination chamber, thus causing a lesser preheating of raw material in the remaining steps of the kiln string, while the second, and smaller, stream of raw material, after being preheated to a lower temperature in the preceding steps of the kiln string is withdrawn therefrom to be introduced with the desired temperature lowering effect into the suspension withdrawn from the calcination chamber.

Figure 3:
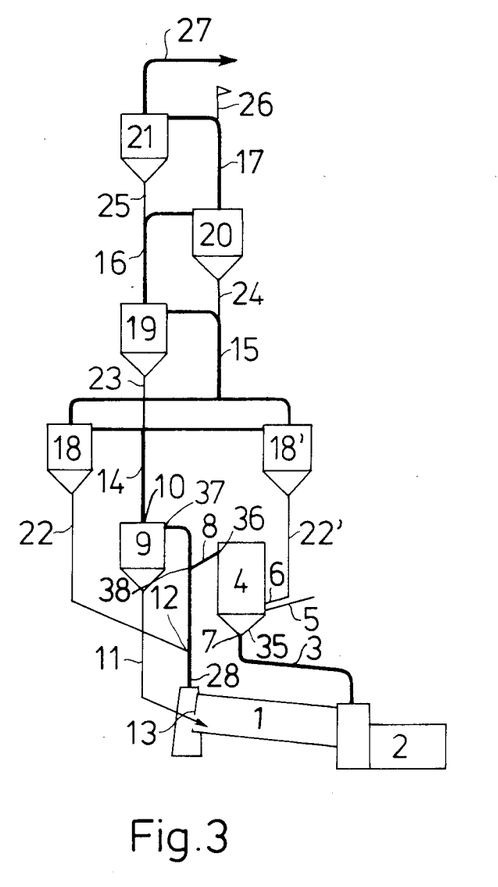
FIG. 3 shows a one-string preheater plant where the second stream of pulverulent raw material suspended in exit gas from a rotary kiln is introduced into the suspension transfer duct between the calcination chamber and the precipitator.

In the plant shown in FIG. 3, the preheater is constructed as a single string preheater and the division of the raw meal is performed in the last preheating step, the riser pipe 14 being divided into two branches directed to cyclones 18 and 18', respectively. The mass ratio between the two stream may be controlled by means of a not shown damper or valve arranged in the gas outlet duct of cyclone 18.

The calcination chamber is of similar construction to that in FIGS. 1 and 2. The first stream of preheated pulverulent raw material is introduced, via the material outlet duct 22', into the calcination chamber, and the second stream of pulverulent raw material is introduced, via the material outlet duct 22, in the kiln exit gas riser pipe 28 where it is suspended in the kiln exit gas, causing a desirable quenching of the kiln gas and reducing the risk of bakings at the kiln gas outlet. This pulverulent raw material/kiln gas suspension is introduced at a junction 38 into the suspension passing through the transfer duct 8 so that the two suspensions are mixed. The suspension withdrawn from the calcination chamber is thus cooled. The mixed suspensions are directed to the cyclone 9 having an exit gas outlet 10 connected to the riser pipe 14.

In the plant shown in FIG. 4, the preheater is of similar construction to that in FIG. 3, and the inlet for the second stream of pulverulent raw material is arranged as in FIG. 1. The calcination chamber 4 is similarly constructed as in the previous examples but with the central inlet 7 for oxygen-containing gas in the bottom connected to the exit gas outlet 13 of the rotary kiln 1 via a riser pipe 28 provided with an inlet 6 for the first stream of pulverulent raw material, and an inlet 33 connected with the hot air pipe 3.

In operation, the first stream of preheated pulverulent raw material is introduced into and suspended in the kiln exit gas. Hot air is introduced into this suspension via the pipe 3 and the resulting suspension of the first stream of pulverulent raw material in oxygen-containing gas is introduced into the calcination chamber through its bottom. At the chamber bottom this suspension comes into contact with the fuel, and the first stream of pulverulent raw material is burned and calcined in suspended state and withdrawn as a suspension from the chamber. This suspension is cooled by introducing the second stream of preheated pulverulent raw material through the duct 22 as a coherent stream into the suspension transfer duct 8. Thermal equilibrium is practically obtained between suspension gas and suspended material which is precipitated in the cyclone 9 and directed for further heat treatment in the rotary kiln 1.

In the plant shown in FIG. 5, the preheater is constructed as a classical one string preheater delivering one coherent stream of preheated pulverulent raw material which is divided into two streams by a splitting gate 34. The first stream of preheated pulverulent raw material is, via the material outlet duct 22', which branches from the duct 22, directed to the calcination chamber 4 which is constructed as the corresponding chambers in FIGS. 1 and 2. The suspension outlet duct 8 from the calcination chamber is connected to a first suspension inlet opening in the cyclone 9. The second stream of preheated pulverulent raw material is, via a second branch 22" of the material outlet duct 22, introduced into the kiln exit gas riser pipe 28 connected to another suspension inlet opening in the cyclone 9. The two suspensions are hence united in the cyclone 9 proper in which precipitation and cooling occur simultaneously.

Other constructional variations of the plants shown in FIGS. 1 to 5 are possible. Any of the two material streams withdrawn from the preheater shown in FIGS. 1 or 2 may be divided into substreams as described above, and one of these substreams may be united with the other stream. This arrangement provides better control of the mass ratio between the two streams of pulverulent raw material introduced into the calciner assembly.

In the plants shown in FIGS. 3 and 4, the pulverulent raw material may, instead of being divided by dividing the riser pipe 14, be divided by a splitting gate as shown in FIG. 5 and vice versa.

If it is desired to operate with a rather low temperature of the second stream of pulverulent raw material, the pulverulent raw material may be divided not in the last preheating step, but in one of the preceding steps. One stream is thus withdrawn from the preheater at an earlier step as the second stream of pulverulent raw material having a rather low temperature while the other stream is further preheated and withdrawn from the lowermost step as the first stream of pulverulent raw material.

The number of cyclones in the preheaters may be larger or smaller than shown.

The introduction of the first stream of pulverulent raw material into the calcination chamber may further comprise division of that stream into two substreams, one being suspended in the oxygen-containing gas before this gas is introduced through the bottom of the burning chamber, the other being introduced as a coherent stream on or near the sloping bottom of the chamber.

EXAMPLES

Pilot plant tests of the method according to the invention as well as of state of art methods were carried out in an apparatus with a calcination chamber 4 constructed according to FIG. 1 with an internal diameter of 900 mm and a height of 5000 mm and connected to a particle precipitator cyclone 9 via a suspension transfer duct 8 with a length of 5000 mm and an average internal diameter of 300 mm having an inlet duct 12 for the second stream of pulverulent raw material arranged at a distance of 2000 mm from the cyclone inlet.

In a typical test of the method according to the invention 1200 $Nm^3$ per hour of air having a temperature of 750° C., 1900 kg per hour of Portland cement raw meal preheated to a temperature of 700° C., and 155 kg per hour of pulverised coal were introduced at the bottom of the calcination chamber. The pulverised coal was of a difficult type, known to present burning out problems, having a content of volatile matter of 18% and a fineness corresponding to a residue of 10% on a 90 micron sieve.

The gas retention time in the calcining zone was 2.0 seconds.

The suspension had a temperature of 1035° C. at the calcining zone suspension outlet.

400 kg per hour cement raw meal having a temperature of 20° were introduced into the hot suspension withdrawn from the calcination chamber through the inlet duct for the second stream of pulverulent raw material.

The temperature of the suspension at the cyclone inlet was measured at 880° C. The cyclone exit gas has an oxygen content of 2.9% and a temperature of 850° C. The calcined product withdrawn from the cyclone showed a degree of calcination of 90%, and a carbon content of 0.20%.

Carbon was determined by subjecting a weighed quantity of calcined product to a decarbonation treatment and burning the carbon present in the resulting decarbonated material, fixing the resulting $CO_2$ combustion product in a carbon dioxide absorber, and measuring the amount of absorbed $CO_2$.

In a comparison test the calciner was run according to the known art, introducing only one stream of cement raw meal:

1300 Nm³ per hour of air having a temperature of 750° C., 2300 kg per hour of Portland cement raw meal preheated to 750° C. and 175 kg per hour of the pulverised coal used in the first test were introduced at the bottom of the calcination chamber.

The gas retention time in the calcining zone was 2.0 seconds.

The suspension had a temperature of 930° C. at the calcining zone suspension outlet.

The suspension was directed to the cyclone without introduction of any cement raw meal through the inlet duct for the second stream of pulverulent raw material.

The temperature of the suspension at the cyclone inlet was measured to 880° C. The temperature of the cyclone exit gas was higher, viz. 885° C., although heat loss could be expected to give rise to a temperature fall about 30° C., indicating that the suspension gas was still burning in the cyclone. The oxygen content of the cyclone exit gas was 2.2%. The calcined product withdrawn from the cyclone showed a degree of calcination of 92% and a carbon content of 0.80%.

A comparison of the results of these two tests indicates that the method according to the invention eliminates undesired delayed burning in the cyclone and reduces the carbon content of the calcined product with a factor four from an unacceptable level, i.e. 0.80%, to an acceptable level, i.e. 0.20%.

Similar tests operating with mixtures of combustion gas and air as oxygen-containing gas showed corresponding reductions of the carbon content of the calcined product and elimination of delayed burning in the cyclone.

I claim:

1. In a method of calcining pulverulent raw material, wherein said raw material is suspended in a stream of oxygen-containing gas in a calcining zone, whereafter said suspension is withdrawn from said calcining zone, said calcined material is precipitated from said suspension in a precipitation zone, and gas and precipitated material are withdrawn from said precipitation zone as calciner exit gas and calcined product, respectively, the improvement comprising the steps of introducing said fuel, a stream of said oxygen-containing gas and a first stream of said pulverulent raw material into a high temperature part of said calcining zone; calcining said raw material from said first stream in said high temperature part of the zone in an overheated atmosphere at a temperature of 950°-1150° C. with a gas retention time in said high temperature part of the zone within the range of 0.5-5 seconds; and reducing the temperature of said calcined suspension exiting from said high temperature part of the zone in a following normal calcining temperature part of said calcining zone by 100°-300° to a level within the range of 800°-1000° C. by suspending a second stream of said pulverulent raw material into said suspension exiting from the high temperature part into the normal calcining temperature part and thereafter precipitating said calcined material in said precipitation zone.

2. A method according to claim 1, including maintaining said gas retention time in said high temperature part of the calcining zone within the range 1-3 seconds, and reducing the temperature of said suspension withdrawn from said part of the calcining zone by 150°-250° C. to a value within the range 850°-950° C.

3. A method according to claim 1, including suspending said second stream of pulverulent raw material in an inert gas before introducing said material into said suspension exiting from said high temperature part of the calcining zone.

4. A method according to claim 1, including suspending said second stream of pulverulent raw material in said suspension exiting from said high temperature part of the calcining zone into the normal calcining temperature part before introducing said suspension into said precipitation zone.

5. A method according to claim 4, including maintaining said gas retention time in said normal calcining temperature zone between said suspending of said second stream of pulverulent raw material in said suspension exiting from said high temperature calcining zone and introduction thereof into said precipitation zone between 0.1-3 seconds.

6. A method according to claim 5, including maintaining said time between 0.2-1.5 seconds.

7. A method according to claim 1, including preheating said first and second streams of pulverulent raw material to a temperature of between 500°-850° C.

8. A method according to claim 7, including preheating said raw material to a temperature of between 600°-830° C.

9. A method according to claim 1, including maintaining the mass ratio of said first and second streams of pulverulent raw material in the range of between 10-1.

10. A calcining apparatus for carrying out said method according to claim 1, said apparatus comprising a high temperature calcining part in the form of a tubular calcination chamber having an upright axis, and annular bottom wall sloping downwardly and inwardly, a central inlet for oxygen-containing gas in said bottom wall, inlets for leading said fuel and said first stream of pulverulent raw material into a bottom portion of said chamber, and a suspension outlet at the top of said chamber; a normal calcining temperature part in the form of a suspension transfer duct leading from suspension outlet of said high temperature calcination chamber to a suspension inlet of a particle precipitator having outlets for calciner exit gas and calciner product; and an inlet for delivering a second stream of pulverulent raw material into the path of said suspension of said raw material from said first stream between said suspension outlet of said high temperature calcination chamber and said calciner exit gas outlet of said particle precipitator.

11. Apparatus according to claim 10, wherein said particle precipitator is provided with an inlet duct for said second stream of pulverulent raw material.

12. Apparatus according to claim 10, wherein said particle precipitator is provided with an inlet duct for an inert gas, said inert gas inlet duct having an inlet for said second stream of pulverulent raw material.

13. Apparatus according to claim 10, wherein said suspension transfer duct is provided with an inlet for said second stream of pulverulent raw material.

14. Apparatus according to claim 10, wherein said suspension transfer duct joins an inert gas duct at a junction, and said inert gas duct has, upstream of said junction, an inlet for said second stream of pulverulent raw material.

* * * * *